United States Patent [19]

Dean et al.

[11] Patent Number: 5,008,964
[45] Date of Patent: Apr. 23, 1991

[54] CHILD'S TOILET

[75] Inventors: Janet C. Dean, R.R. 3, Box 120, Spencer, Iowa 51301; Terry B. Dean, Mountain View, Calif.

[73] Assignee: Janet C. Dean, Spencer, Iowa

[21] Appl. No.: 477,465

[22] Filed: Feb. 9, 1990

[51] Int. Cl.⁵ .................... A47K 11/04; A61G 9/00
[52] U.S. Cl. ............................... 4/661; 4/449; 4/452; 4/479; 4/483
[58] Field of Search ............ 4/661, 483, 484, 476, 4/479, 452, 449; 116/67 R; 340/692, 573

[56] References Cited

U.S. PATENT DOCUMENTS

| | | | |
|---|---|---|---|
| 2,513,444 | 7/1950 | Barnes | 155/31 |
| 3,020,528 | 2/1962 | Swanson, Jr. et al. | 4/483 |
| 3,268,916 | 8/1966 | Hix, Jr. | 116/67 R X |
| 3,416,163 | 12/1968 | Jordan | 4/483 |
| 3,691,980 | 9/1972 | Shastal | 116/67 R |
| 4,023,151 | 5/1977 | Markham | 340/692 |
| 4,162,490 | 7/1979 | Fu et al. | 4/483 X |
| 4,288,789 | 9/1981 | Molinick et al. | 340/692 X |
| 4,383,241 | 5/1983 | Kojima et al. | 340/692 X |
| 4,539,559 | 9/1985 | Kelly et al. | 340/573 |
| 4,757,542 | 7/1988 | Neahr, II et al. | 381/51 |
| 4,816,809 | 3/1989 | Kim | 340/692 |
| 4,883,749 | 11/1989 | Robert et al. | 4/304 |

FOREIGN PATENT DOCUMENTS 18469 9/1969 Australia ................... 4/483

Primary Examiner—Henry K. Artis
Attorney, Agent, or Firm—Paltmatier & Sjoquist

[57] ABSTRACT

A potty chair for toilet training children and of the type having an automatic speech and tune producing capability. The tune generating circuit (36) plays a tune when a child first sits on the potty chair seat (24). A moisture sensing circuit (32) detects the introduction of bodily waste into the waste receptor (20); which it communicates to the speech generating circuit (38), causing it to play a voice message. In addition, a changeable data storage circuit (40) determines the tune and voice messages that are produced. Other features of the invention include control of the tune and speech volume and power conditioning for the electronic circuits.

6 Claims, 12 Drawing Sheets

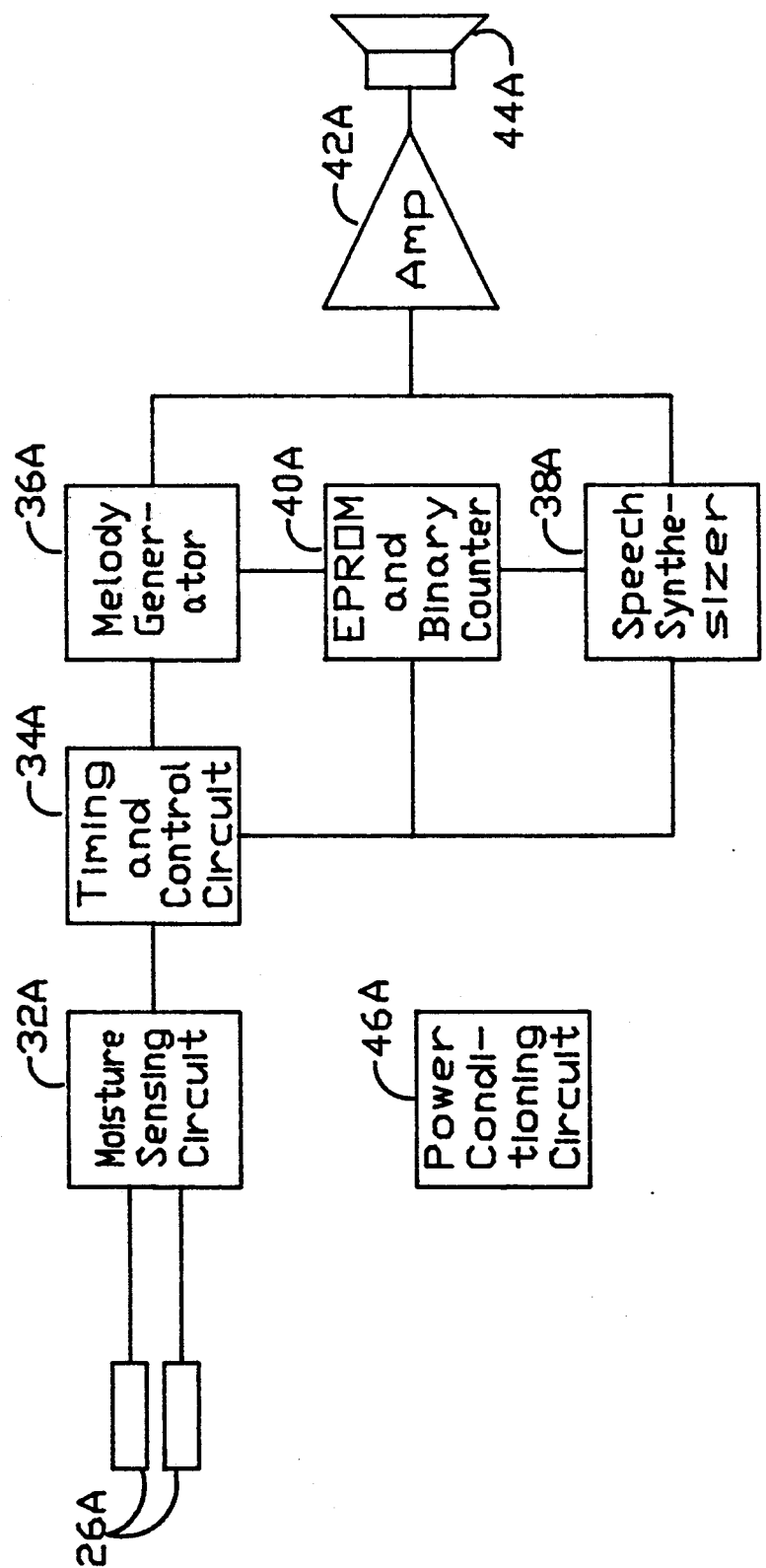

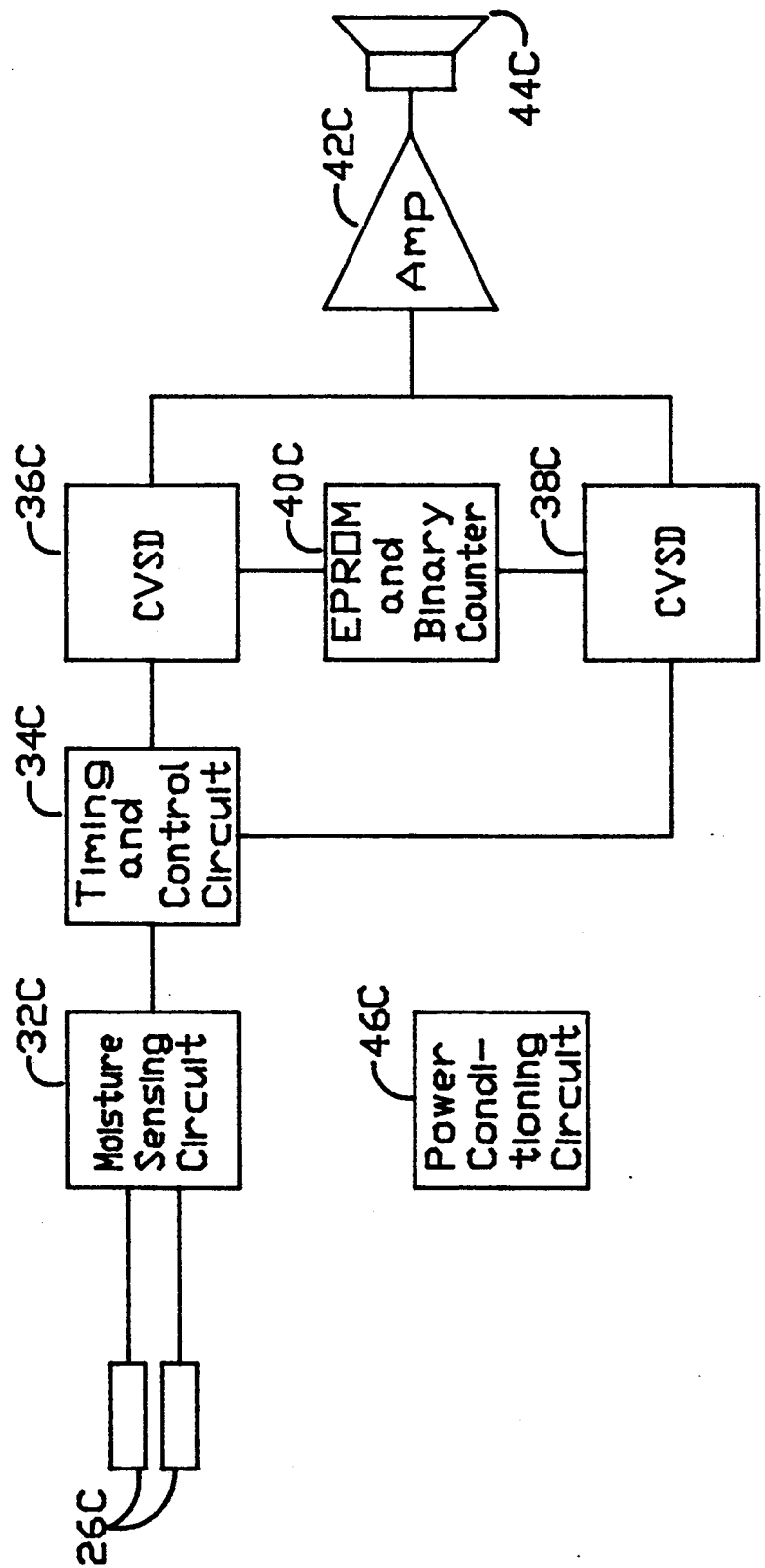

CHILD'S TOILET

BACKGROUND

1. Field of Invention

This invention relates to toilets, specifically to such toilets or potty chairs used to toilet train children.

2. Description of Prior Art

Parents are now commonly toilet training their children with small toilet trainers or potty chairs as they are more commonly known. Potty chairs aid in toilet training by providing a small profile that suits the small physical size of children better. They allow the children easier access to the toilet than the large adult sized toilets do. By solving the size difficulty, toilet training is much more obliging. While present potty chairs help in toilet training, other elements can still make the training process long, involving, and frustrating.

Current potty chairs provide no entertainment to a child while they are learning to use it. Unless a parent provides the child with a toy or other form of entertainment, the child may loose interest in their training. Entertaining a child can take a lot of a busy parent's time, but if an uninteresting environment exists, the child's learning progress may be slow.

Present potty chairs provide little motivation for the child to use it rather than a diaper. Parents are again burdened with this responsibility. If parents select positive motivation, it can take a lot of involvement from them to succeed. However, if they use negative motivation, there can be undue stress placed on both the child and parents.

OBJECTS AND ADVANTAGES

Accordingly, several objects and advantages of my invention are:

(a) to provide a potty chair that allows for a practical and rapid method of toilet training a child;

(b) to provide motivation to a child to use the potty chair, rather than continuing to relieve themselves in a diaper;

(c) to provide entertainment to a child while toilet training, which may reduce the amount of parental supervision required for training;

(d) to provide a potty chair that automatically plays an entertaining tune when a child first sits on the potty chair;

(e) to provide a potty chair that automatically plays a congratulatory voice message when a child relieves himself in the potty chair; and (f) to provide a potty chair that allows the child or parents to change or customized both the tune and voice message to suit their tastes.

Further objects and advantages are to provide a potty chair that can be used easily and conveniently to toilet train a child; which is simple to use and inexpensive to manufacture; which can be powered by common, inexpensive batteries; and is safe for the child to use. Still further objects and advantages will become apparent from a consideration of the ensuing description and drawings.

DRAWING FIGURES

In the drawings, closely related figures have the same number but different alphabetic suffixes.

FIGS. 3A to 3C are schematic overviews of the talking potty chair's electronic circuits embracing various types of devices.

Figure 1:
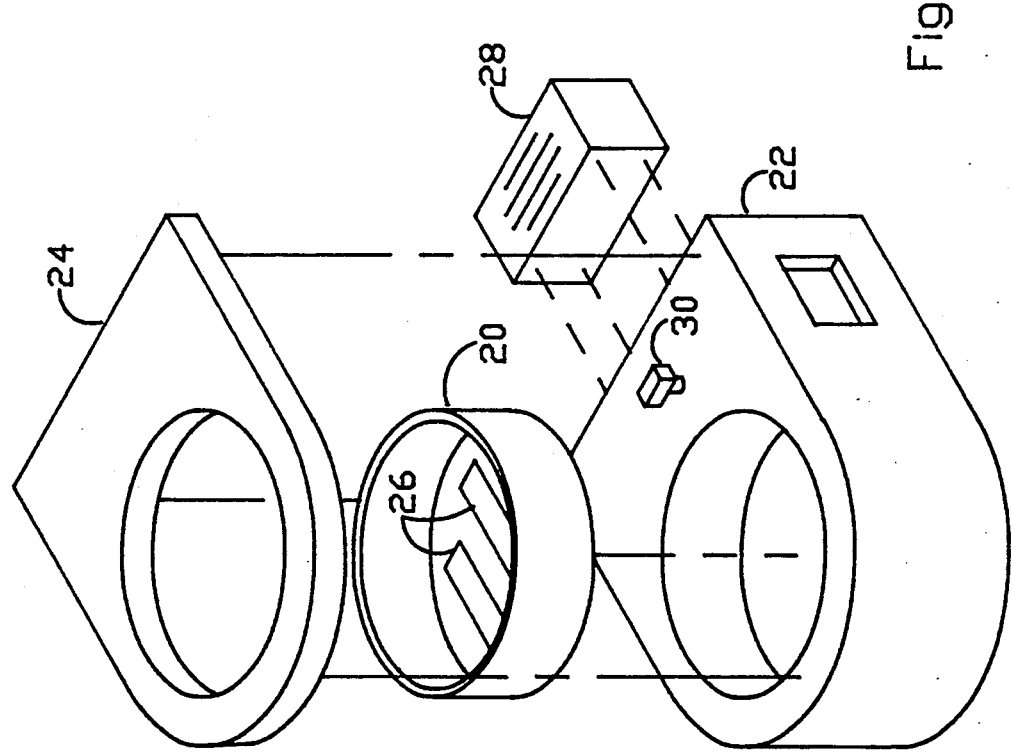
FIG. 1 shows a general view of the physical features of a talking potty chair.

REFERENCE NUMERALS IN DRAWINGS 20 waste receptor
22 potty chair base
24 potty chair seat
26 sensor pads
28 project box
30 switch
32 moisture sensing circuit
34 timing and control circuit
36 tune generating circuit
38 speech generating circuit
40 data storage circuit
42 amplifier circuit
44 loudspeaker
46 power conditioning circuit
48 detector latch
50 NAND gate
52 NAND gate
54 system-reset gate
56 resistor
58 capacitor
60 resistor
62 resistor
64 trigger gate
66 resistor
68 capacitor
70 timer
72 variable resistor
74 capacitor
76 C-E logic gate
78 resistor
80 capacitor
82 variable resistor
84 capacitor
86 inverter
88 binary counter
90 EPROM memory
92 resistor
94 capacitor
96 inverter
98 speech processor
100 low pass filter
102 variable resistor
104 audio amplifier
106 melody generator
108 switch
110 transistor
112 capacitor
114 battery
116 regulator
118 capacitor
120 capacitor
122 capacitor
124 detector latch 126 resistor
128 resistor
130 reset gate
132 message-enable gate
134 tune latch
136 end-of-tape multivibrator
138 bilateral switch
140 motor-control gate
142 resistor
144 transistor
146 cassette drive motor
148 resistor
150 resistor
152 metal sensor
154 resistor
156 capacitor
158 capacitor
160 resistor
162 right-head amplifier
164 left-head amplifier
166 right-tape head
168 left-tape head
170 audio amplifier.

DESCRIPTION

FIGS. 1 to 10

FIG. 1 illustrates a typical embodiment of the potty chair of the present invention. A removable waste receptor 20 inserts and rests on a potty chair base 22. A potty chair seat 24 rests on top of potty chair base 22 and has a hole which allows access to waste receptor 20. A pair of sensor pads 26 mount in the inside bottom of waste receptor 20 and connect by wire to a project box 28. Project box 28 houses all the required electronic circuits and mounts on the rear of potty chair base 22. Project box 28 connects via wire to a switch 30 mounted on potty chair base 22 directly under a lip on which potty chair seat 24 rests.

Figure 2:
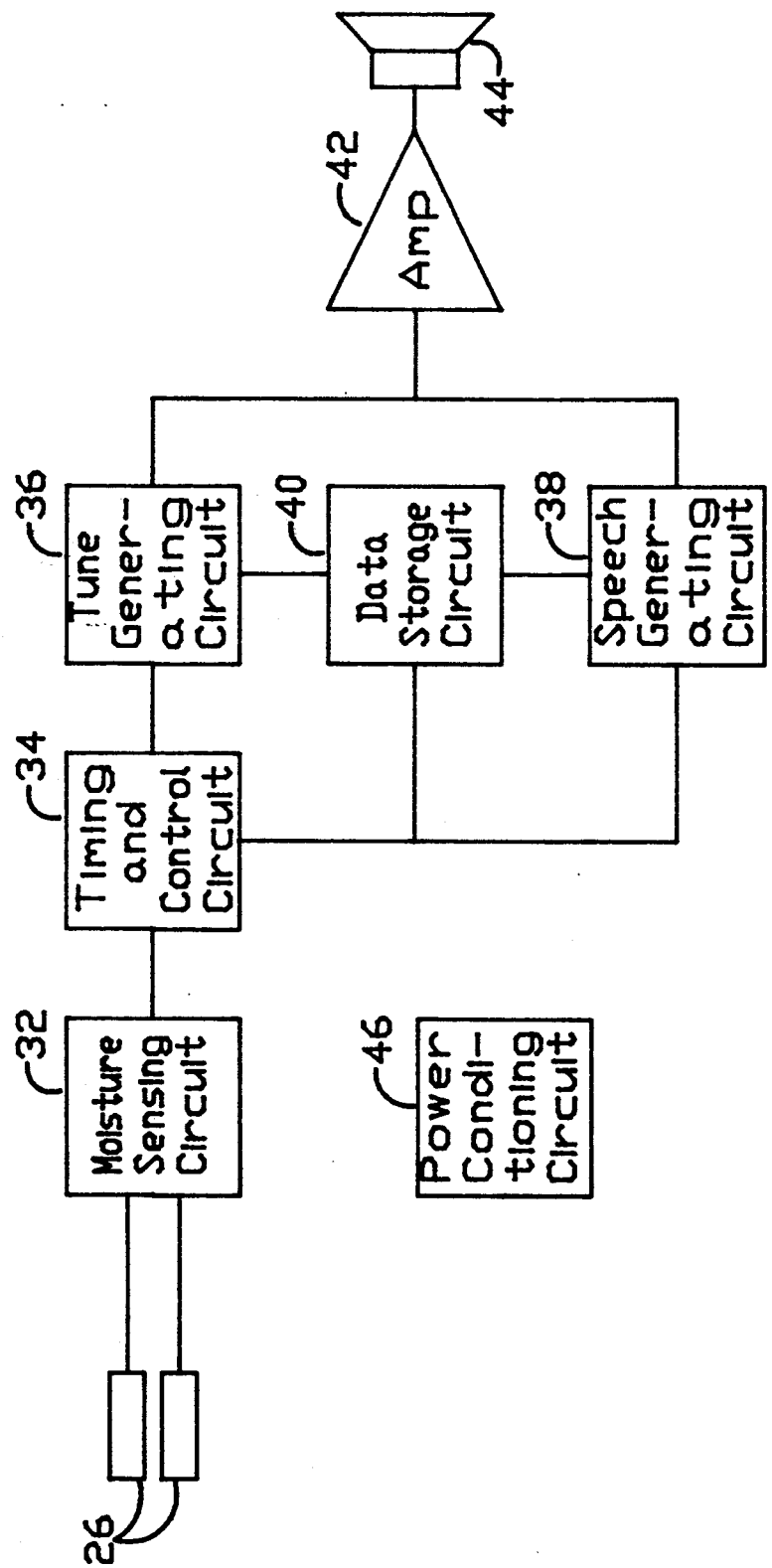
FIG. 2 is a schematic overview of the electronic circuits required by a talking potty chair.

FIG. 2 is a schematic of all electronic circuits the talking potty chair requires. The system is comprised of seven sections or functionally different circuits: a moisture sensing circuit 32, a timing and control circuit 34, a tune generating circuit 36, a speech generating circuit 38, a data storage circuit 40, an amplifier circuit 42 with a loudspeaker 44, and a power conditioning circuit 46.

Moisture sensing circuit 32 detects the introduction of urine or feces into waste receptor 20 by sensor pads 26 mounted in its bottom. When detection occurs, moisture sensing circuit 32 generates a signal which starts timing and control circuit 34. Timing and control circuit 34 produces control signals and clock pulses required to start and operate tune generating circuit 36, speech generating circuit 38, and data storage circuit 40. Tune generating circuit 36 produces a series of musical sounds which when played in sequence form a pleasant song or tune. Tune generating circuit 36 couples these sounds to amplifier circuit 42 which amplifies the sounds to a level adequate to drive loudspeaker 44. Speech generating circuit 38 generates speech sounds which when produced in the proper order, form words and ultimately a complete message. Speech generating circuit 38 also couples its sounds to amplifier circuit 42 which again amplifies the sounds to a level adequate to drive loudspeaker 44. Data storage circuit 40 contains a list of stored data that it provides sequentially to the tune generating circuit 32 and the speech generating circuit 34. The data directs the type of musical or speech sound the appropriate generating circuit will produce. Power control circuit 46 controls the application of electrical power to all electronic circuits. It also takes the unregulated power from the power source and coverts it to a well regulated and noise free voltage. This is necessary to provide for reliable electronic circuit operation and a high quality output.

There are various possibilities regarding the types of devices used to fulfill the embodiments of the tune generating, speech generating, and data storage circuits as described in the discussion of FIG. 2. FIG. 3A shows a talking potty chair in which an electronic speech synthesizer integrated circuit fulfills the requirement for speech generating circuit 38A. An electronic melody generator integrated circuit serves as tune generating circuit 36A. Finally, an Erasable Programmable Read Only Memory (EPROM) and a binary counter make a suitable data storage circuit 40A.

Figure 3B:
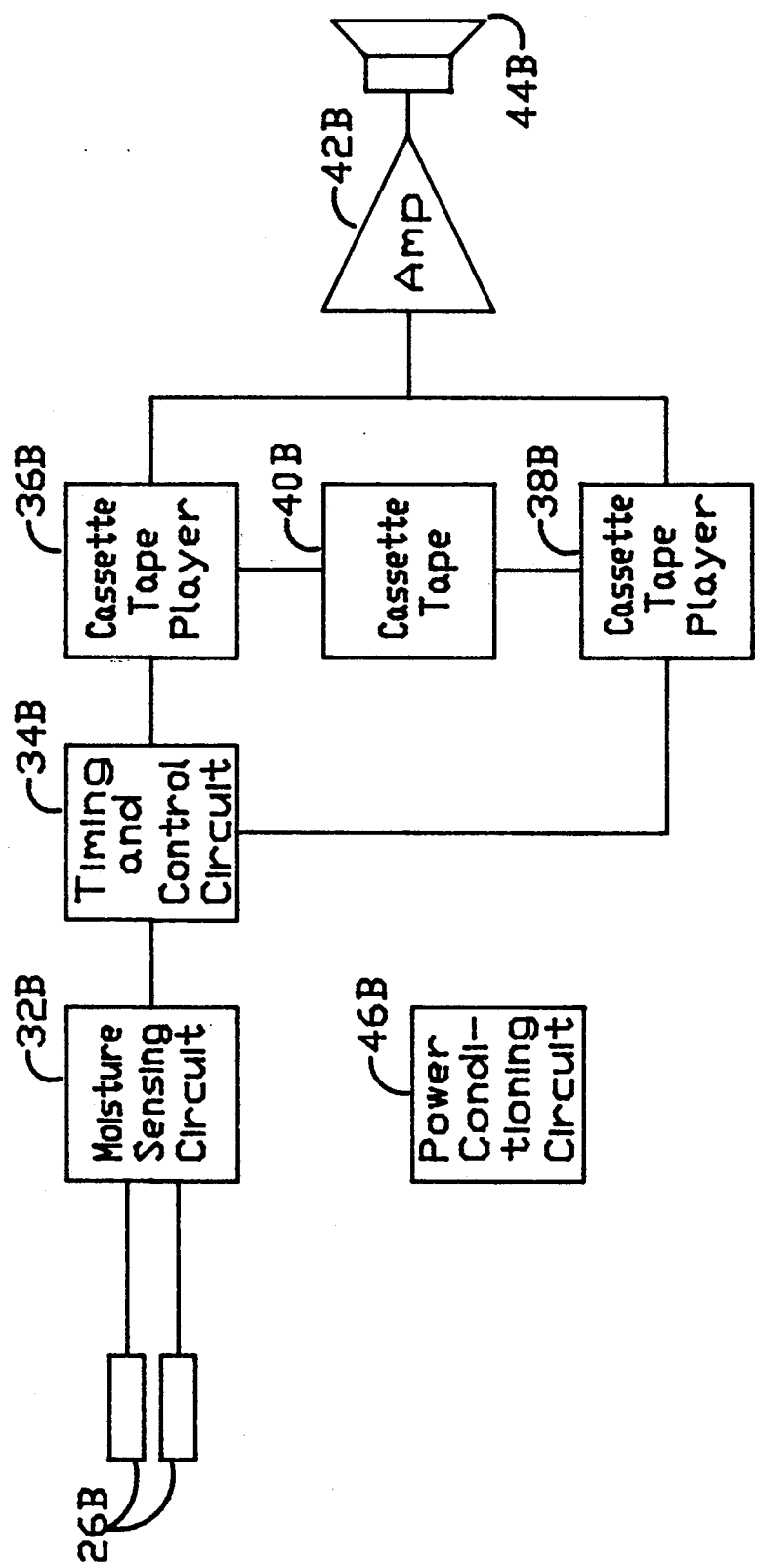

FIG. 3B shows a talking potty chair where a stereo cassette tape player provides speech generating circuit 38B and tune generating circuit 36B. A cassette tape serves as data storage circuit 40B. It is important to note that the tape player in this figure could be any type of tape player or analog playback device. The appropriate media would then substitute for the cassette tape.

FIG. 3C illustrates a talking potty chair in which an EPROM stores a digitized voice message and tune. The EPROM along with a binary counter serve as data storage device 40C. A Continuously Variable Slope Delta (CVSD) demodulator provides for both tune generating circuit 36C and speech generating circuit. Again, the EPROM could be replaced by any type of digital storage device such as a compact disk, digital audio tape, or nonvolatile memory. The CVSD demodulator would then be replaced by the appropriate decoding device.

Figure 4:
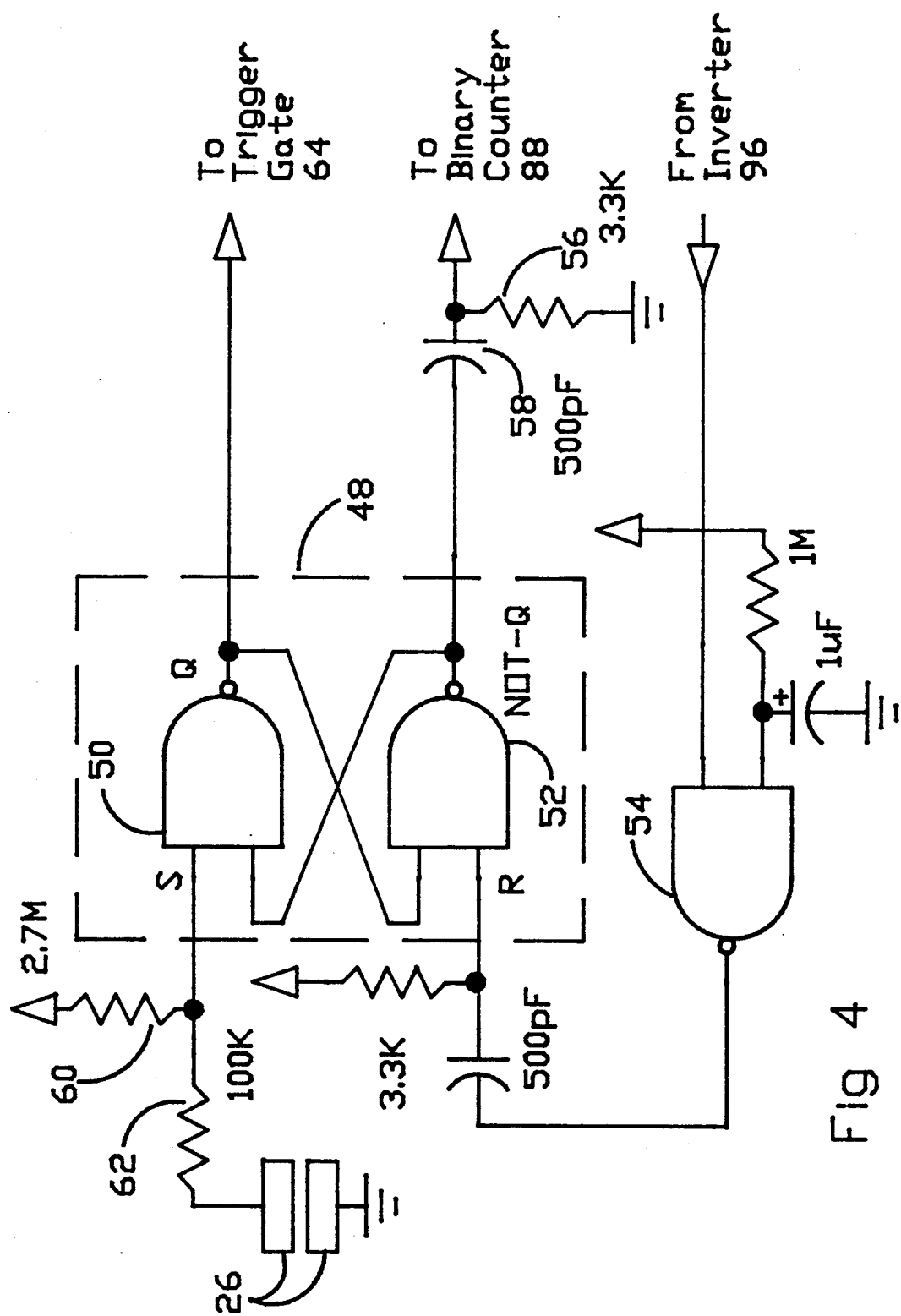
FIG. 4 is a schematic of a moisture sensing circuit.

FIGS. 4 through 10 detail aspects of the talking potty chair's electronic circuits. FIG. 4 is a detailed representation of a moisture sensing circuit. The main apparatus in this circuit is a detector latch 48 made from two NAND logic gates 50 and 52. A pair of resistors 60 and 62 and sensor pads 26 connect to the S input of detector latch 48. A system-reset gate 54 connects to the R input. On the NOT-Q output of detector latch 48, a resistor 56 and a capacitor 58 interface this output to a binary counter 88 in the data storage circuit. The Q output couples to a trigger gate 64 in the timing and control circuit.

Figure 5:
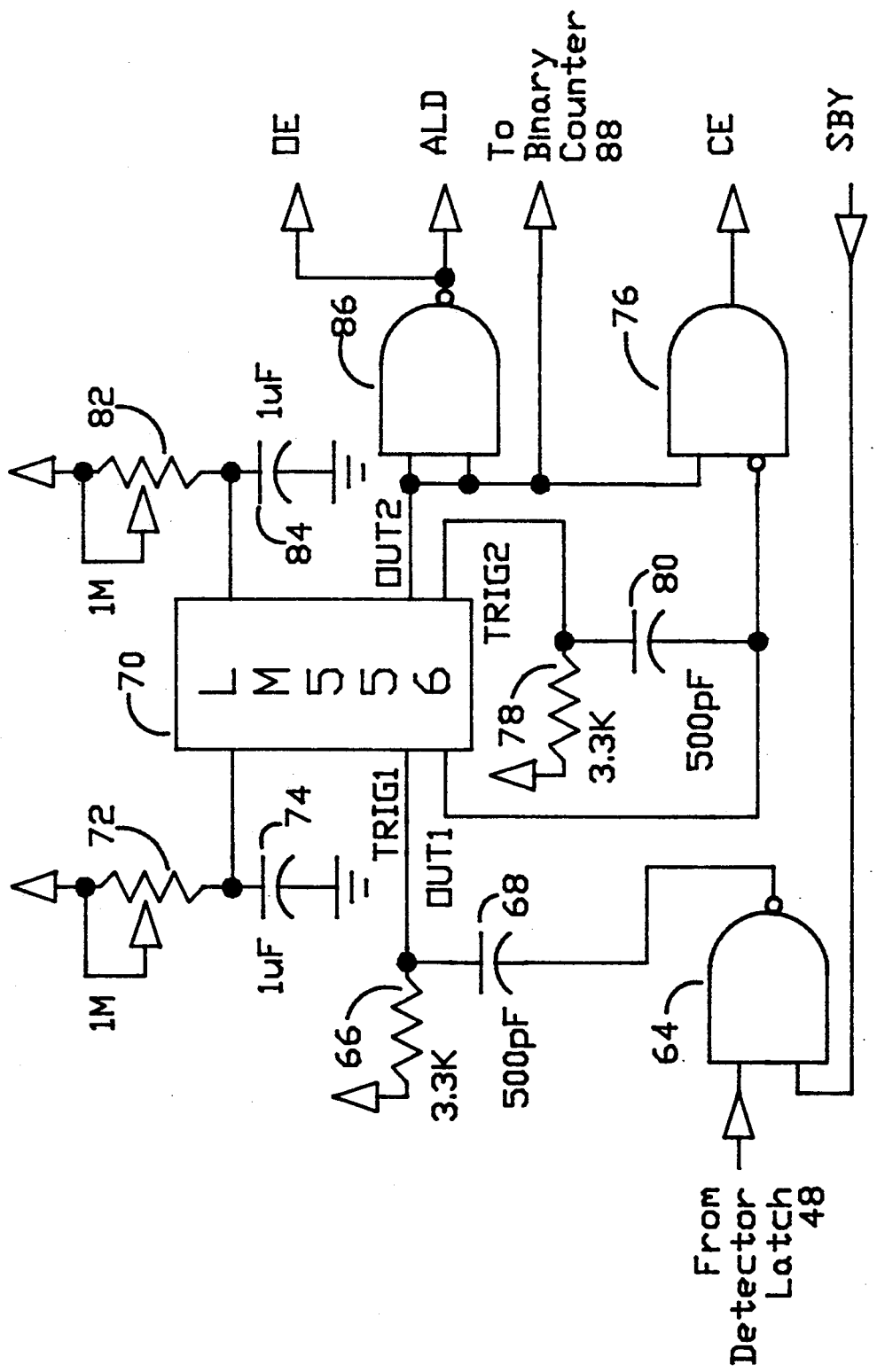
FIG. 5 is a schematic of a timing and control circuit.

FIG. 5 is a detailed depiction of the timing and control circuit. The moisture detection signal from detector latch 48 connects to a trigger gate 64. A resistor 66 and a capacitor 68 couple trigger gate 64's output to a timer 70 TRIG1 input. Timer 70 is a LM556 dual timer linear integrated circuit available from many manufacturers. A variable resistor 72 and a capacitor 74 control the time period of timer 70's OUT1 output. This output connects to a C-E logic gate 76. It also routes through a resistor 78 and a capacitor 80 to the timer 70 TRIG2 input. A variable resistor 82 and a capacitor 84 control the time period of timer 70's OUT2 output. This output goes to C-E logic gate 76, an inverter 86, and a binary counter 88 in the data storage circuit. The outputs from inverter 86 and C-E logic gate 76 connect to the data storage circuit and speech generating circuit.

Figure 6:
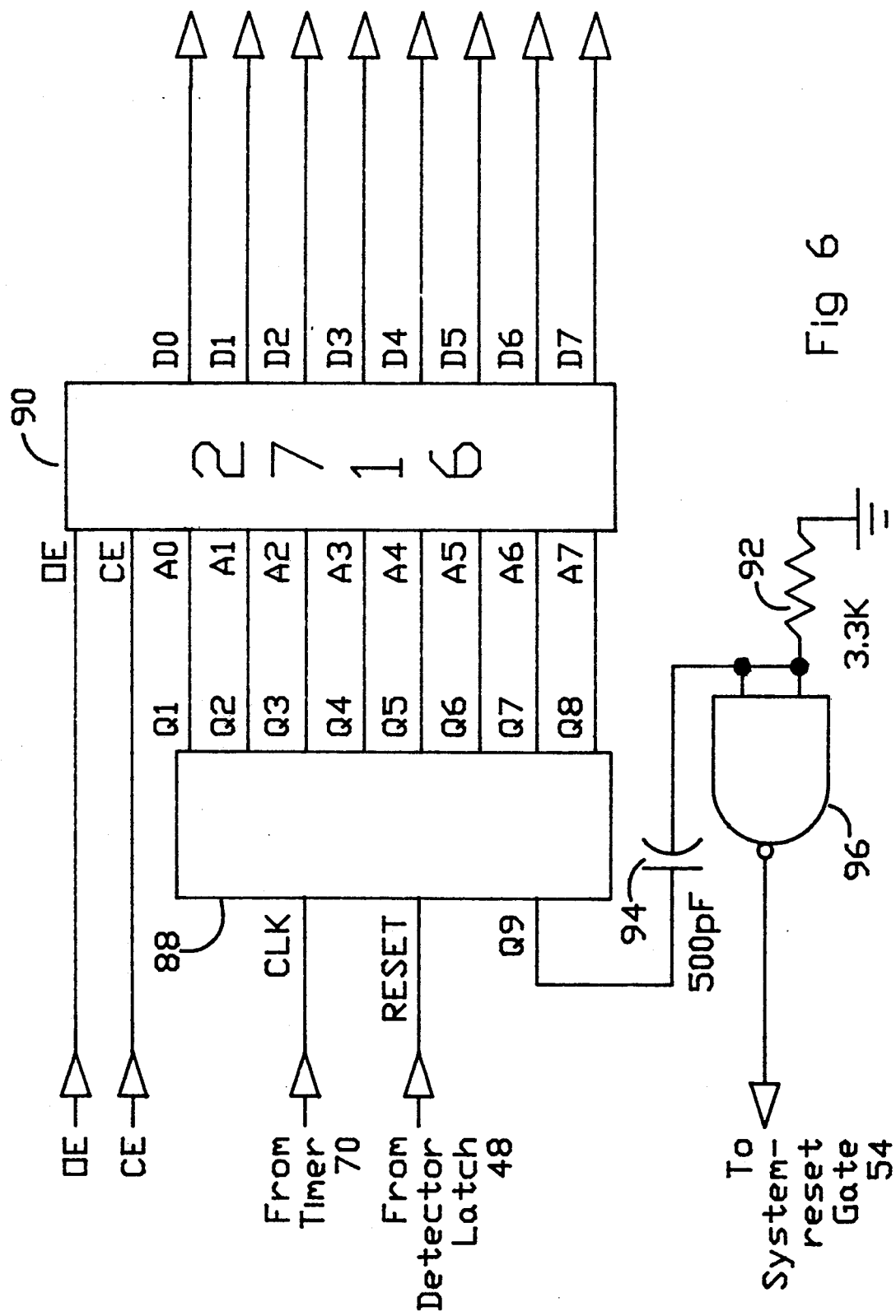
FIG. 6 is a schematic of a data storage circuit.

FIG. 6 is an in-depth portrayal of the data storage circuit. Timer 70's OUT2 signal from the timing and control circuit connects to a binary counter 88 CLK input. Binary counter 88's RESET input comes from detector latch 48's NOT-Q output in the moisture sensing circuit. Binary counter 88's Q1 through Q8 outputs couple to a 2716 EPROM memory 90 integrated circuit available from many sources. Binary counter 88's Q9 output routes through a resistor 92 and a capacitor 94 to an inverter 96. Inverter 96's output couples back to the moisture sensing circuit's system-reset gate 54. The signals from C-E logic gate 76 and inverter 86 in the timing and control circuit connect to EPROM memory 90's OE and CE inputs. EPROM memory 90's D0 through D7 outputs route to the speech generating circuit.

Figure 7:
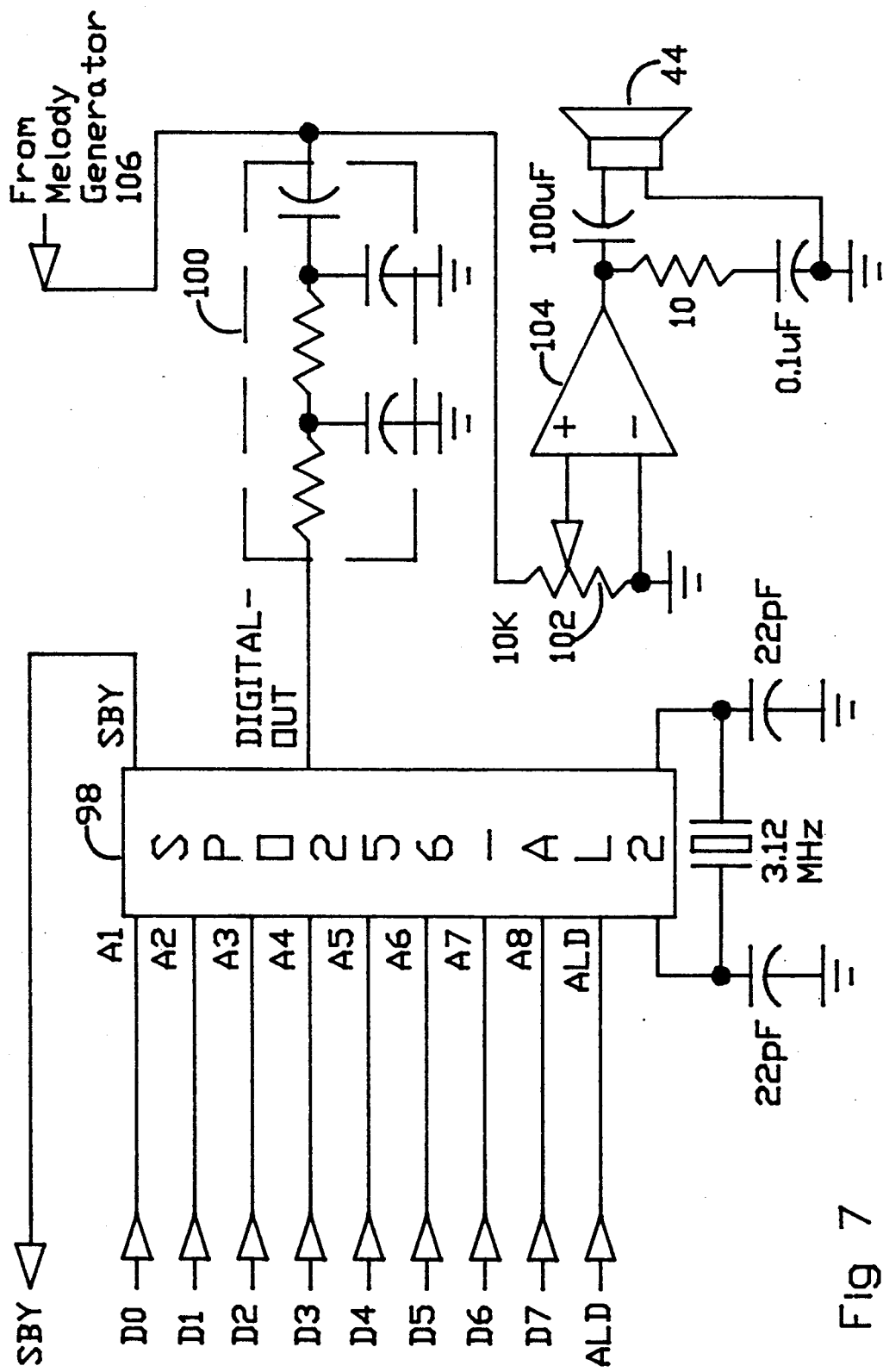
FIG. 7 is a schematic of a speech generating circuit.

FIG. 7 shows an embodiment of the speech generating circuit and the amplifier circuit. The D0 through D7 signals from the data storage circuit connect to the A1 through A8 inputs to a SPO256-AL2 speech processor 98 integrated circuit made by General Instruments. Speech processor 98's ALD input routes from the timing and control circuit's inverter 86 output. Speech processor 98's SBY output connects back to the timing and control circuit's trigger gate 64. Speech processor's 98's DIGITAL-OUT output couples through a low pass filter 100 and a variable resistor 102 to an audio amplifier 104. Audio amplifier 104's output drives loudspeaker 44.

Figure 8:
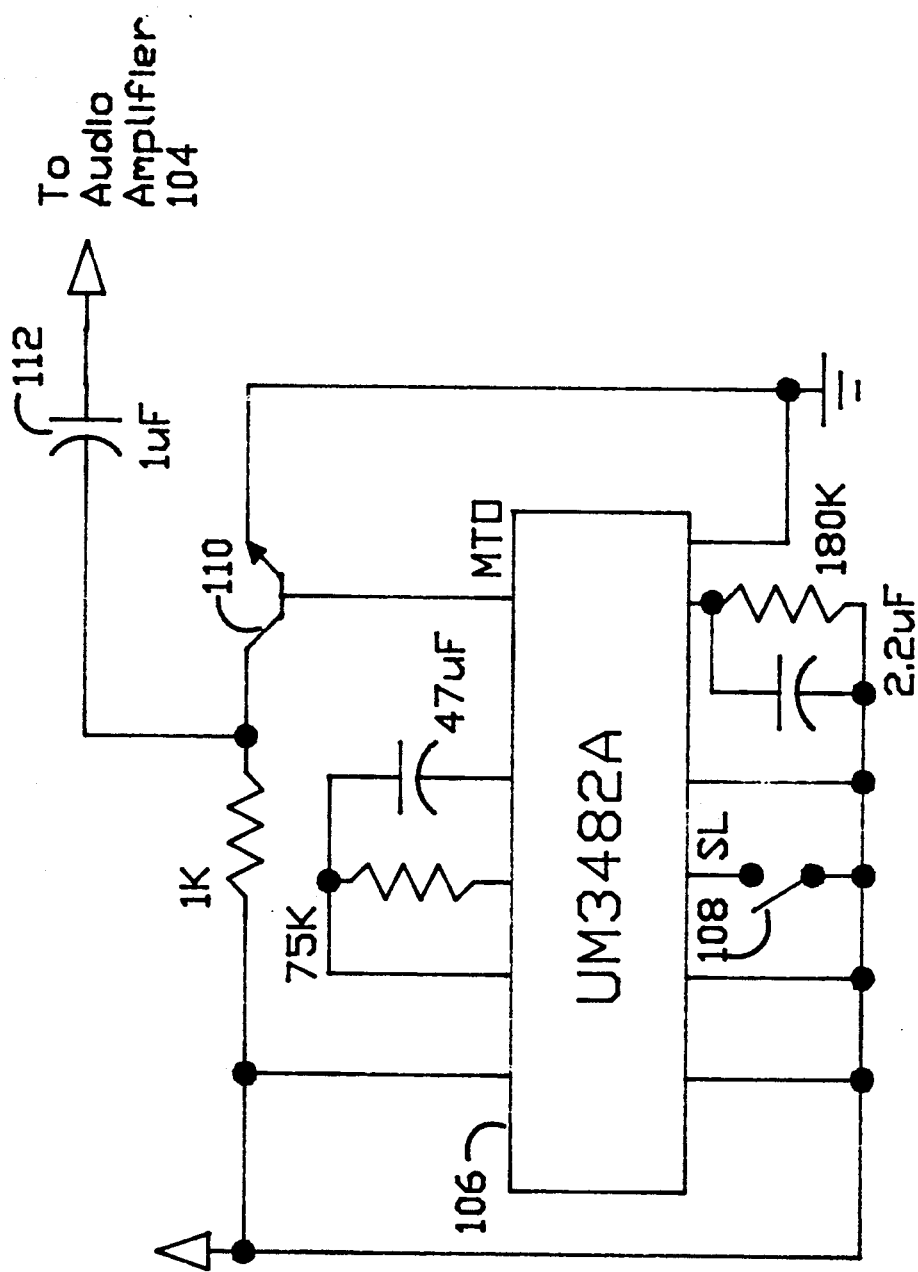
FIG. 8 is a schematic of a tune generating circuit.

FIG. 8 illustrates the tune generating circuit. A UM3482A melody generator 106 integrated circuit available from Radio Shack generates tunes for the talking potty chair. A push button switch 108 connects to melody generator 106's SL input. Melody generator 106's MTO output routes through a transistor 110 and a capacitor 112 to variable resistor 102 and audio amplifier 104 in the speech generating circuit.

Figure 9:
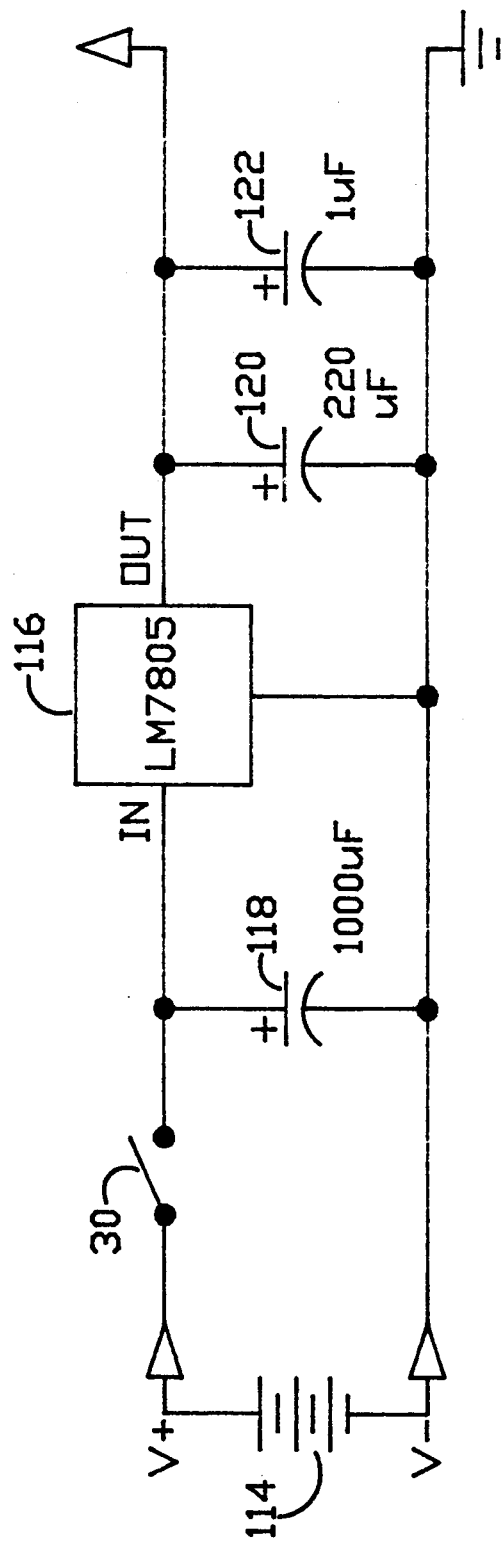
FIG. 9 is a schematic of a power conditioning circuit.

FIG. 9 is a detailed aspect of the power conditioning circuit. A nine volt transistor battery 114 powers the talking potty chair's electronic circuits. The positive terminal of battery 114 routes through switch 30 mounted on potty chair base 22 and a filter capacitor 118 to a LM7805 regulator 116 linear integrated circuit. Regulator 116's output goes to two capacitors 120 and 122 and finally to the electronic circuits.

Figure 10:
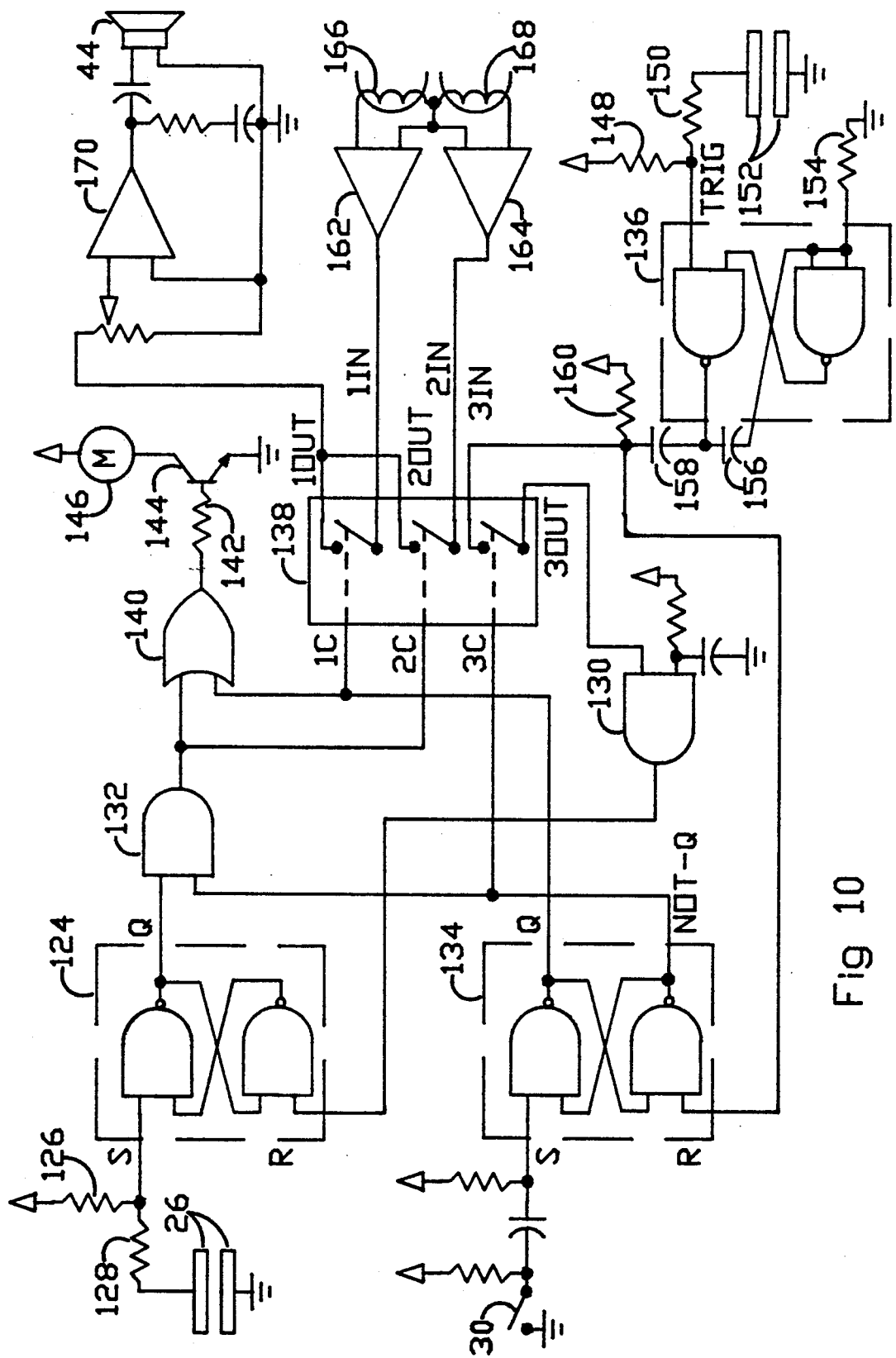
FIG. 10 is a schematic of an alternate embodiment of all the electronic circuits.

FIG. 10 presents an alternate embodiment of the electronic circuits in the talking potty chair. A detector latch 124 provides a moisture sensing circuit. Two resistors 126 and 128 and sensor pads 26 again are connect to detector latch 124's S input. Detector latch 124's R input connects to a reset gate 130. Detector latch 124's Q output couples to a message-enable gate 132 in the timing and control portion of the circuit.

A tune latch 134 represents the timing and control circuit. Its S input connects to switch 30 mounted on potty chair base 22. Tune latch 134's R input connects to the output of an end-of-tape multivibrator 136. Tune latch 134's NOT-Q output couples to message-enable gate 132 and to the 3C input to a CD4066 bilateral switch 138 integrated circuit. Tune latch 134's Q output routes to the 1C input of bilateral switch 138 and to one input of a motor-control gate 140. The other input to motor-control gate 140 is from message-enable gate 132's output. Motor-control gate 140's output couples through a resistor 142 and a transistor 144 to a cassette drive motor 146 represented by a circled "M" in FIG. 10.

End-of-tape multivibrator 136's TRIG input connects to two resistors 148 and 150 and a metal sensor 152. A resistor 154 and a capacitor 156 determine end-of-tape multivibrator 136's time period. Its output routes through a capacitor 158 and a resistor 160 to the R input of tune latch 134 and the 3IN input to bilateral switch 138.

Bilateral switch 138's 1IN input connects to a right-head amplifier 162 output in the tune/speech generating circuit. The 2IN input connects to a left-head amplifier 164 in the tune/speech generating circuit. Bilateral switch 138's 3OUT output connects to reset gate 130 in the moisture sensing portion of the circuit. Finally, bilateral switch 138's 1OUT and 2OUT outputs connect and route to audio amplifier 170's input. Audio amplifier 170's output drives loudspeaker 44.

A cassette tape player provides the tune and speech generating circuit. A right tape head 166 picks up the tune recorded on tape. Right tape head 166 connects to right-head amplifier 162's input. A left tape head 168 picks up the voice message recorded on tape and sends it to left-head amplifier 164's input. Right-head amplifier 162 routes its output to the 1IN input to bilateral switch 138. Left-head amplifier 164 sends its output to the 2IN input to bilateral switch 138 in the timing and control circuit.

OPERATION

FIGS. 4 THROUGH 10

In FIG. 4, detector latch 48 is comprised of two NAND logic gates 50 and 52, set up in a Set-Reset Latch configuration. It is initially in the "set" state (Q output is at a high voltage level and the Not-Q output is at a low level) after power applies. It is then quickly forced to the "reset" state (Q is low, NOT-Q is high) by system-reset gate 54. This is necessary to generate a low to high voltage level transition out of the NOT-Q output. Resistor 56 and capacitor 58 differentiate this level transition into a trigger pulse and couples it to the data storage circuit to reset its binary counter 88. The power turn-on sequence is now complete and the circuit is in the quiescent state.

The circuit again activates when a moist or wet substance enters waste receptor 20. The substance bridges the gap between sensor pads 26 causing a very small, totally harmless amount of electrical current to flow through sensor pads 26 and resistors 60 and 62. This in-turn causes a voltage drop to occur at detector latch 46's S input, causing detector latch 48 to go to the "set" state. The high level now on the Q output couples to trigger gate 64 in the timing and control circuit.

Turning to FIG. 5, the high level now on trigger gate 64 causes it to change its output to a low level. Resistor 66 and capacitor 68 differentiate the voltage drop to form a trigger pulse which routes to timer 70's TRIG1 input. Timer 70 is configured as two monostable multivibrators in which the first multivibrator triggers the second. The trigger pulse on the TRIG1 input causes the OUT1 output to go high for the time period established by variable resistor 72 and capacitor 74. The high level on the OUT1 output applies to C-E logic gate 76 causing its output to go high as well.

As the high on the OUT1 output goes low, resistor 78 and capacitor 80 differentiate the voltage drop to form a trigger pulse which couples to the TRIG2 input. This causes the OUT2 output to go high for a time period established by variable resistor 82 and capacitor 84. The high level on the OUT2 output applies to C-E logic gate 76 causing its output to stay high (the OUT1 output makes it high initially). Inverter 86 inverts the high on the OUT2 output to a low forming the OE and ALD signals. The OUT2 output also couples to binary counter 88's CLK input in the data storage circuit.

In FIG. 6, binary counter 88's outputs Q1 through Q8 connect to EPROM memory 90 and serve as address inputs. As described in the discussion of FIG. 4, binary counter 88 resets during the power turn-on sequence. Therefore, its outputs (Q1 through Q9) are all at low levels. This indicates to EPROM memory 90 an address of zero. EPROM Memory 90 stores, in sequential addresses, a series of preprogrammed commands. When C-E logic gate 84's output goes high (see discussion of FIG. 5) it couples to EPROM memory 90's CE (Chip Enable) input. This action causes EPROM memory 90 to fetch the command stored at the address binary counter 88 indicates. Then, timer 70's OUT1 signal goes low and the OUT2 signal goes high. The OUT2 signal couples to C-E logic gate 76 holding its output still high and keeping EPROM Memory 90 enabled through its CE input. The inverted timer 70 OUT2 signal routes to EPROM memory 90's OE (Output Enable) input. When it goes low (as OUT2 goes high), the command fetched by the action on EPROM memory 90's CE input, transfers from EPROM memory 90's output lines (D0 through D7) to speech processor 98.

Timer 70's OUT2 signal also goes to binary counter 88's CLK input. Everytime the OUT2 signal makes a transition from a high to a low, binary counter 88 increases or counts by binary 1. This occurs until binary counter 88 reaches a count of binary 64. Now in the counting sequence, binary counter 88's Q9 output goes high. Resistor 92 and capacitor 94 differentiate this high into a trigger pulse which inverter 96 inverts to a low pulse. It routes to system-reset gate 54 where it causes a total system reset just as the power turn-on sequence did, as described in the discussion of FIG. 4.

Now in FIG. 7, the speech generating circuit uses a SP0256-AL2 speech processor 98. Speech processor 98 is preprogrammed with data and instructions to create a wide variety of speech sounds (allophones) in digital form using an internal digital filter, microcontroller, and pulse width modulator. Address inputs (A1 through A8) and the ALD (Address Load) input control speech processor 98. The object of controlling speech processor 98 is to load a command into it on the address inputs then put a low on the ALD input. This directs speech processor 98 to jump to that address in its internal program and generate the speech sound stored there. While speech processor 98 is generating the requested speech sound, its SBY (Standby) output goes high. It then returns low after it completes all the internal instructions for that particular speech sound.

Now back to the circuit description, the data lines (D0 through D7) from EPROM memory 90 connect to and serve as speech processor 98's address inputs (A1 through A8). The inverted OUT2 signal from timer 70 goes to one last place: speech processor 98's ALD input. It serves as the trigger to load a command and generate a speech sound as described above. The speech sound is in digital form when it leaves speech processor 98's DIGITAL-OUT output. The speech sound converts to an analog signal when it passes through low pass filter 100. The analog speech signal then routes through volume control variable resistor 102 to audio amplifier 104. Audio amplifier 104 boosts the volume of the analog speech signal to a level sufficient to drive loudspeaker 44.

The SBY output of speech processor 98, as described above, goes high while speech processor 98 is busy generating the speech sounds. It then returns to a low when it's done. The SBY output couples to trigger gate 64 where the high to low transition acts the same as the signal from detector latch 48 did to start the timing sequence in the first place. Therefore, detector latch 48 starts the timing sequence. The SBY signal from speech processor 98 restarts the timing sequence after each speech sound. This continues until binary counter 88 reaches a count of 64 and resets the entire system to its quiescent state.

In FIG. 8, a UM3482A melody generator 106 integrated circuit generates tunes for the talking potty chair. Melody generator 106 plays a melody according to previously programmed internal instructions. Push button switch 108 selects the song that melody generator 106 will automatically play when power applies to it. Switch 108 connects to melody generator 106's SL input. Each time switch 108 is pushed, a high pulse feeds to the SL input causing melody generator 106 to change to the next internally programmed song. The same selected song will play each time melody generator 106 is powered-up. The signal representing the song exits melody generator 106 on the MTO output and couples to the base of transistor 110. Transistor 110 amplifies the signal and routes it through capacitor 112 back to the amplifier circuit in FIG. 7. The signal routes through variable resistor 102 to audio amplifier 104 just as the analog speech signal did. Audio amplifier 104 boosts the level of the tune signal sufficient to drive loudspeaker 44. After completing the song, melody generator 106 powers itself down.

In FIG. 9, a nine volt transistor battery 114 supplies power for the electronic circuits. The negative side of the supply connects directly to the electronic circuits. The positive side routes through switch 30 that activates only when a child is sitting on the potty chair. While switch 30 activates, current flows through it and filter capacitor 118 to voltage regulator 116. Regulator 116 regulates the nine volts from battery 114 to five volts required by succeeding electronic circuits. Two capacitors 120 and 122 further filter the voltage to remove any remaining noise that may degrade the quality of the electronic circuits.

FIG. 10 presents an alternate embodiment of the talking potty chair's electronic circuits. When power initially applies to the circuit, reset gate 130 couples a negative going reset pulse to the R input of detector latch 124. This pulse insures detector latch 124 is in the "reset" condition. End-of-tape multivibrator 136 also produces a reset pulse during power turn-on. The output goes high for a time period established by resistor 154 and capacitor 156, then returns low. Capacitor 158 and resistor 160 differentiate the voltage drop into a trigger pulse which couples to tune latch 134's R input. This trigger pulse forces tune latch 134 into the "reset" state. This completes the power turn-on sequence and the circuit is in its quiescent state.

Tune latch 134 connects to switch 30 mounted on potty chair base 22. When a child sits on potty chair seat 24, switch 30 closes feeding a low pulse to tune latch 134's S input. This action causes tune latch to toggle to the "set" condition. The high now out of the Q output routes to motor-control gate 140 forcing its output high as well. This high routes through current limiting resistor 142 to the base of transistor 144. The high on the base of transistor 144 causes it to conduct, thus allowing current to flow to cassette drive motor 146. Cassette drive motor 146 starts to run. The high signal from tune latch 134's Q output also routes to bilateral switch 138's 1C input. This high causes the 1IN input to connect to the 1OUT output.

When cassette drive motor 146 starts to turn, right-tape head 166 begins to pick up the tune audio that was previously recorded on the cassette tape. Right-head amplifier 162 amplifies the signal from right-tape head 166 and its output routes to bilateral switch 138's 1IN input. As described above, this input now connects to the 1OUT output, therefore, passing the tune audio to audio amplifier 170. Audio amplifier 170 amplifies the signal to a level strong enough to drive loudspeaker 44.

When the endless cassette tape circulates completely, a metal sensor strip passes across metal sensor 152. Current flows through metal sensor 152 and resistors 148 and 150, causing a voltage drop on end-of-tape multivibrator 136's TRIG input. End-of-tape multivibrator 136's output goes high for the time period set by resistor 154 and capacitor 156, then it returns low. Resistor 160 and capacitor 158 differentiate the voltage drop into a trigger pulse. This trigger pulse routes to tune latch 134's R input, causing tune latch 134 to return to the "reset" state. The circuit again returns to its quiescent state.

While tune latch 134 is in the "reset" state, the NOT-Q output is high. This high routes to message-enable gate 132 and bilateral switch 138's 3C input. The high on bilateral switch 138's 3C input causes the 3IN input to connect to the 3OUT output.

The circuit again activates when a moist or wet substance enters waste receptor 20. The substance bridges the gap between sensor pads 26 causing a very small, totally harmless amount of electrical current to flow through sensor pads 26 and resistors 126 and 128. This in-turn causes a voltage drop to occur at detector latch 124's S input, causing detector latch 48 to go to the "set" state. The high level now on the Q output couples to message-enable gate 132. This high with the high from tune latch 134's NOT-Q output causes message-enable gate 132's output to go high as well. This high couples to motor gate 140 forcing its output high, thus turning on transistor 144 as described previously. Current again begins to flow to cassette drive motor 146. The high from message-enable gate 132 also routes to bilateral switch 138's 2C input. This causes bilateral switch 138's 2IN input to connect to the 2OUT output.

When cassette drive motor 146 starts to turn this time, left-tape head 168 starts to pick up the voice audio that was previously recorded on the cassette tape. Left-head amplifier 164 amplifies the signal from left-tape head 168 and routes its output to bilateral switch 138's 2IN input. As described above, this input now connects to the 2OUT output, which passes the voice audio to audio amplifier 170. Audio amplifier 170 amplifies the signal to a level strong enough to drive loudspeaker 44.

When the endless cassette tape again circulates completely, the metal sensor strip passes across metal sensor 152. This causes current to flow through metal sensor 152 and resistors 148 and 150, causing a voltage drop on end-of-tape multivibrator 136's TRIG input. End-of-tape multivibrator 136's output goes high for the time period set by resistor 154 and capacitor 156, then it returns low. Resistor 160 and capacitor 158 differentiates the voltage drop into a trigger pulse. This time however, the trigger pulse routes through bilateral switch 138's 3IN input to the 3OUT output. This output couples the trigger pulse to reset gate 130. Reset gate 130 passes the trigger pulse to detector latch 124's R input causing detector latch 124 to to return to the "reset" state. The circuit again returns to its quiescent state.

CONCLUSION, RAMIFICATIONS, AND SCOPE OF INVENTION

Accordingly, the reader will see that the talking potty chair of this invention can be used easily and conveniently to toilet train a child; which is simple to use and inexpensive to manufacture; which can be powered by common, inexpensive batteries; and is safe for the child to use. Furthermore, the talking potty chair has additional advantages in that it allows for a rapid and practical method of toilet training a child;

it provides motivation to a child to use the potty chair, rather than continuing to relieve themselves in a diaper;

it provides entertainment to a child while toilet training, which may reduce the amount of parental supervision required for training;

it provides a potty chair that automatically plays an entertaining tune when a child first sits on the potty chair;

it provides a potty chair that automatically plays a congratulatory voice message when a child relieves himself in the potty chair; and it provides a potty chair that allows the child or parents to change or customized both the tune and voice message to suit their tastes.

Although the description above contains many specificities, these should not be construed as limiting the scope of the invention but as merely providing illustrations of some of the presently preferred embodiments of this invention. For example, the potty chair can be different shapes or designs; the electronic circuits can be replaced by any type of electronic device, such as discrete components, transistor-transistor logic integrated circuits, diode-transistor logic integrated circuits, linear integrated circuits, etc.; the tune generating circuit can be excluded, so there is only a voice message; etc.

Thus the scope of the invention should be determined by the appended claims and their legal equivalents, rather than by the examples given.

We claim:

1. A music and speech generating potty chair with a removable waste receptor and a seat used to toilet train a child, comprising:
   (a) a pressure sensitive switch between the seat and the chair adapted to close when the child sits on the seat;
   (b) a waste moisture sensing circuit with a sensor mounted in the bottom of the receptor adapted to generate a detection signal upon sensing bodily waste introduced into the receptor;
   (c) a timing and control circuit responsive to the switch being closed and the detection signal adapted to produce control signals and the clock pulses;
   (d) a data storage circuit responsive to the control signals and the clock pulses containing musical sound data and speech message data;
   (e) a tune generating circuit responsive to the control signals and the clock pulses and being adapted to access the musical sound data from the data storage circuit and convert the musical sound data into musical sounds when the switch is closed by the child sitting on the chair to thereby require less parental supervision and entertain the child while on the chair;

(f) a speech generating circuit responsive to the control signals and clock pulses and being adapted to access the speech message data from the data storage circuit and convert the speech message data into speech sounds when the detection signal is generated by the child excreting bodily waste into the receptor to thereby congratulate the child when the child excretes bodily waste while on the chair; and (g) an amplifier circuit with a loudspeaker coupled to the tune generating circuit to amplify and audibly produce the musical sounds and coupled to the speech generating circuit to amplify and audibly produce the speech sounds.

2. The potty chair of claim 1, further comprising a power conditioning circuit to provide regulated and noise free voltage to all circuits.

3. The potty chair of claim 1, wherein the speech generating circuit comprises any one from the group of: an electronic speech processor integrated circuit and a continuously variable slope delta demodulator.

4. The potty chair of claim 1, wherein the tune generating circuit comprises any one from the group of: an electronic melody genertor integrated circuit, a continuously variable slope delta demodulator and an audio tape player.

5. The potty chair of claim 1, wherein the data storage circuit comprises any one from the group of: an erasable programmable read only memory and binary counter, an audio tape, a compact disk, and a nonvolatile memory device.

6. The potty chair of claim 1, wherein the moisture sensing circuit comprises a detector latch with an input and an output made from two NAND logic gates and has two resistors and the sensor connected to the latch input and a message-enable gate connected to the latch output.

* * * * *